United States Patent [19]

Stademann

[11] Patent Number: 5,563,941
[45] Date of Patent: Oct. 8, 1996

[54] METHOD FOR THE DISTRIBUTION OF CALLS IN A COMMUNICATION NETWORK

[75] Inventor: Rainer Stademann, Egmating, Germany

[73] Assignee: Siemens Aktiengesellschaft, Munich, Germany

[21] Appl. No.: 488,496

[22] Filed: Jun. 9, 1995

[30] Foreign Application Priority Data

Jun. 9, 1994 [EP] European Pat. Off. .............. 94108897

[51] Int. Cl.$^6$ ............................ H04Q 3/64; H04M 15/00; H04M 7/00; H04M 3/00
[52] U.S. Cl. ............................ 379/266; 379/114; 379/134; 379/221; 379/230; 379/309
[58] Field of Search ................................ 379/112, 113, 379/114, 115, 201, 207, 219, 220, 221, 265, 266, 309, 133, 134, 230

[56] References Cited

U.S. PATENT DOCUMENTS

| | | | |
|---|---|---|---|
| 4,191,860 | 3/1980 | Weber ........................................ | 379/115 |
| 4,510,351 | 4/1985 | Costello et al. ...................... | 379/112 X |
| 4,737,983 | 4/1988 | Frauenthal et al. ...................... | 379/221 |
| 4,858,120 | 8/1989 | Samuelson ......................... | 379/309 X |
| 4,953,204 | 8/1990 | Cuschleg, Jr. et al. ................ | 379/266 |
| 5,291,550 | 3/1994 | Levy et al. .............................. | 379/242 |

FOREIGN PATENT DOCUMENTS

| | | |
|---|---|---|
| 0478206A2 | 1/1992 | European Pat. Off. . |
| 0490446A1 | 6/1992 | European Pat. Off. . |

OTHER PUBLICATIONS

An ISDN Aplication–Simulation Modeling of NACD–Liu et al, Northern Telecom, 20, Oct. 1992, 279/284.
Intelligent Network Routing Using CCS7 And ISDN–Sam Chau, Mark Rau, Bell Northern Research, pp. 1640–1644.
Advanced Techninques For Managing Telecommunications Networks–Richard B. Wolf, 2460 IEEE Communications Magazine 28 1990 Oct. No. 10, New York.

*Primary Examiner*—Jeffery Hofsass
*Assistant Examiner*—Harry S. Hong
*Attorney, Agent, or Firm*—Hill, Steadman & Simpson, A Professional Corporation

[57] ABSTRACT

For distributing calls in a communication network, a central network authority that forwards calls from subscribers to servers for further servicing of the calls provides an optimally successful distribution, i.e. a low load-conditioned cleardown rate by the servers, even when it cannot directly register the workload of a server. In order to achieve this, the central network authority monitors the reason for the cleardown of a call by a server and excludes a server from the call distribution procedure for a specific time span when this server clears an allocated calldown due to lack of adequate capacity.

8 Claims, 10 Drawing Sheets

FIG 5

| Q1 |
|---|
| Queue Capacity=5<br>Servers: S1, S2 |
|  |
|  |
| Call Context E |
| Call Context D |

| S1 |
|---|
| Queue = Q1<br>Maximum Capacity=2<br>Address=089/72212345<br>Relaxation Time=50 s<br>Relax Strategy=p |
| State = Available<br>Residual Capacity=1 |
| Call Context B |
|  |

| S2 |
|---|
| Queue = Q1<br>Maximum Capacity=1<br>Address=<br>060/87654321<br>RelaxationTime=60 s |
| State=Not Available<br>Residual Capacity=0 |
| Call Context C |

FIG 7

| Q1 |
|---|
| Queue Capacity=5<br>Servers: S1, S2 |
| |
| |
| |
| Call Context E |

| S1 |
|---|
| Queue = Q1<br>Maximum Capacity=2<br>Address=089/72212345<br>Relaxation Time=50 s<br>Relax Strategy=p |
| State = Available<br>Residual Reserve=1 |
| Call Context B |
| |

| S2 |
|---|
| Queue = Q2<br>Maximum Capacity=1<br>Address=<br>060/87654321<br>RelaxationTime=60 s |
| State=Not Available<br>Residual Capacity=0 |
| Call Context D |

METHOD FOR THE DISTRIBUTION OF CALLS IN A COMMUNICATION NETWORK

BACKGROUND OF THE INVENTION

The invention is directed to a method for the distribution of calls in a communication network.

European Letters Patent EP-0 424 015 A2 corresponding to U.S. Pat. No. 4,953,204 discloses a method for the realization of call queues in the architecture of an intelligent network (IN), whereby a service control point (SCP) attempts to indirectly identify a reserve capacity of a server in that it maintains counters about the active calls (IN calls) to the servers switched via the intelligent network. This, however, leads to problems when a server receives calls or activates calls itself that the service control point cannot count because they have not been switched via the IN, or when the service control point loses the current counter reading due to an outage.

European Letters Patent EP-0 478 206 A2 proposes that calls be delivered to a server only when, based on the display reading of a counter, this can service more than one call. This leaves the server a "reserve" for the afore-mentioned special instances, but substantially reduces the average server usage factor.

SUMMARY OF THE INVENTION

It is an object of the invention to solve the above-mentioned problem of the service control point being unable to count when a server receives, calls or activates calls itself, or when the service control point loses the current counter reading due to an outage.

According to the invention, a method is provided for distributing calls in a communication network wherein calls are registered by a central authority of the communication network and are subsequently allocated to servers that then service the calls. The servers can also service calls that have not been registered and allocated by the central authority. After a successful allocation, the central authority monitors whether a server clears an allocated calldown due to lack of capacity. In case of the cleardown of the call due to lack of capacity, the server is excluded from a further allocation of a call by the central authority for a specific time span, or the probability for a further allocation is reduced for the time span.

The quality of a service is enhanced by the method of the invention since, given a server that has rejected or cleared down a call assigned to it by the central authority because of lacking capacity, it is insured that fewer or no more calls are allocated to the same server for a specific time span.

As result of the method of the invention, the dynamic load on the communication network is reduced since calls no longer need to be cleared down as often, and thus a renewed call set up because of a repeated call by a subscriber has to occur less often.

Also with the method of the invention, in case of clear-down of the call due to lack of adequate capacity, the call is allocated to a different server without an ensuing clear-down being perceptible for a call in party. The quality of service is further enhanced since a call rejected by a server because of lack of capacity is not cleared down relative to the subscriber, but is distributed to a different server.

Moreover, the dynamic load on the communication system is further reduced due to the forwarding since calls no longer have to be cleared down as often, and thus a renewed call set up occurs less frequently due to a renewed call of a subscriber.

Also, according to the method of the invention, the allocation by the central authority is implemented with assistance of display values about reserve capacities of the servers. A display value of reserved capacity of a server is formed or updated in that a previous display value is deincremented at every successful allocation of a call to the server by a load capacity of the call, and is correspondingly incremented given every occurring clear-down. The allocation to a server is only allowed to occur when the display value belonging to the server indicates an adequate reserved capacity. The reserve capacity of a server is indirectly identified. The allocation of a call to a server is thus not left up to chance, and there is thus a high probability for an initial successful allocation of a call to a server.

In a further embodiment of the invention, in case of the clear-down of the call by the server due to lack of adequate capacity, the probability for a further allocation of a call to this server is diminished, since the display value of the reserved capacity of the server is reduced by a correction value for a specific time span. The correction value corresponds to the display value at the point in time of the unsuccessful allocation or of the clear-down. The probability for an allocation of a call is greatly diminished over a specific time span. When, however, another call is properly called down immediately after the unsuccessful allocation and the reduction of the reserve capacity display connected therewith and thus the displayed value of the reserve capacity is in turn incremented, a renewed allocation to the server can already occur within the time span.

It is also assured that, following an outage in the SCP that results in a loss of the displayed value of the reserve capacities, the newly formed display values quickly adapt to the real values of the reserve capacities.

Also with the invention, calls that cannot be immediately distributed due to lack of adequate capacity of the servers are first intermediately stored in a queue, a hold request being communicated to the calling party as warranted. The service control point is not forced to clear a calldown when it cannot immediately allocated to a server.

Also with the invention, a charging of the display value of the reserve capacity with a correction value is completely retracted after expiration of the time span. This embodiment is optimally suited for those servers that can service calls in parallel and therefore need not maintain a local queue. In the case of these servers, the displayed value of the reserve capacity is immediately incremented to the indirectly identified capacity reserve after the expiration of the time span.

In a further embodiment of the invention, a charging of the display value of the reserve capacity with a correction value is retracted step-by-step, a step length corresponding to the time span. This embodiment is optimally suited for these servers that can only subsequently service calls and must therefore maintain their own local queue. The reserve capacity or available server capacity is only incremented step-by-step in this case.

BRIEF DESCRIPTION OF THE DRAWINGS

FIG. 5 shows another example of data maintained by a queue program at a specific point in time;

FIG. 7 is a diagram illustrating incrementation of the service control point SCP when the relaxation timer runs down.

DESCRIPTION OF THE PREFERRED EMBODIMENTS

Figure 1:
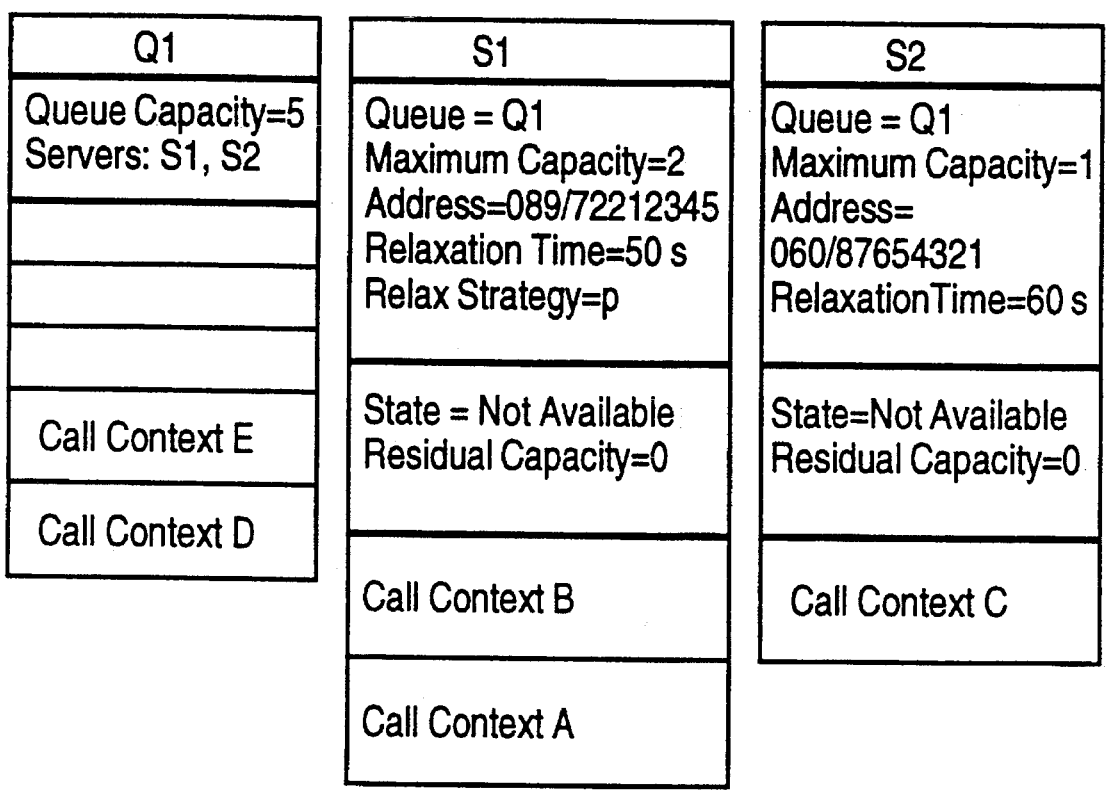
FIG. 1 illustrates an example of data kept by a queue program in a service control point and that reflect conditions of a queue Q 1 and of servers S1 and S2.

In the realization of network-wide, automatic call distribution, call queues, etc., the following problem arises: incoming calls are to be distributed onto a plurality of servers by the call distribution, whereby a call should only be delivered to a server when the latter can also service the call, for example, the server is not fully occupied.

In some communication systems, the reserve capacity of a server (for example, the number of calls that it could still additionally service in parallel) cannot be directly registered. The reserve capacity in such communication systems must therefore be indirectly identified in that the number of calls controlled by the service control point and that are active at the moment for this server are counted, and a conclusion about the remaining reserve capacity is drawn therefrom.

The indirectly identified reserve capacity can deviate from the actual reserve capacity because the server can receive calls at the point in time of this determination that have not been switched via the intelligent network and have thus not been registered by the service control point. Further, the server can also initiate calls, this likewise being incapable of being registered by the service control point. It can occur in these cases that the service control point directs a call to a server that has no free capacity (for example, because of a call received by this server that was not switched via the intelligent network).

When the server then clears the allocated calldown because of lack of reserve capacity, this is registered by the SCP by evaluating the cleardown reason in the cleardown messages and the call is redistributed, so that the cleardown of the call by the server is not visible to the subscriber. Additionally, the displayed value of the reserve capacity is reduced by the SCP for a specific time span (relaxation time span) or is charged with a correction factor in order to preclude a renewed distribution of a call to this server within said time span or to reduce the probability thereof.

After the relaxation time, the SCP assumes that the server has again achieved its original condition or its original reserve capacity and correspondingly increments the displayed value of the reserve capacity.

The method for correcting the displayed value of the reserve capacity also assures that the contents of the reserve capacity counters in case of an outage (for example, after a recovery of the SSP or SCP) nonetheless again comprise correct values of the reserve capacity more or less after the relaxation time.

So that the SCP need not cleardown a registered call that it cannot immediately distribute due to lack of a server ready to accept it, the SCP maintains a queue in which it intermediately stores the registered calls until they are successfully distributed. What is thereby to be understood by "successful distribution" is that a server has in fact also serviced the allocated call and does not clear it down, for instance because of lack of capacity.

From the view of the service control points, such a queue represents a specific goal within the traffic management program (routing tree) of a service subscriber that activates a specific program of the service control point which shall be referred to below as a queue program.

At least one server is allocated to every queue. Further, a server can service more than a single queue.

From the view of the queue program, every server i is represented by at least the following semi-permanent data:

a routing number that indicates the destination address of the server;

a maximum server capacity C (i, t) that indicates the maximum plurality of simultaneous IN calls, i.e. calls controlled by the service control point, that can be handled by the server i. This server capacity can be dependent on the time t.

A relaxation time $T_{rix}(i)$ that indicates the minimum time that the service control point must wait before it makes the next attempt to route a call to a server that had to previously reject a call.

Figure 6:
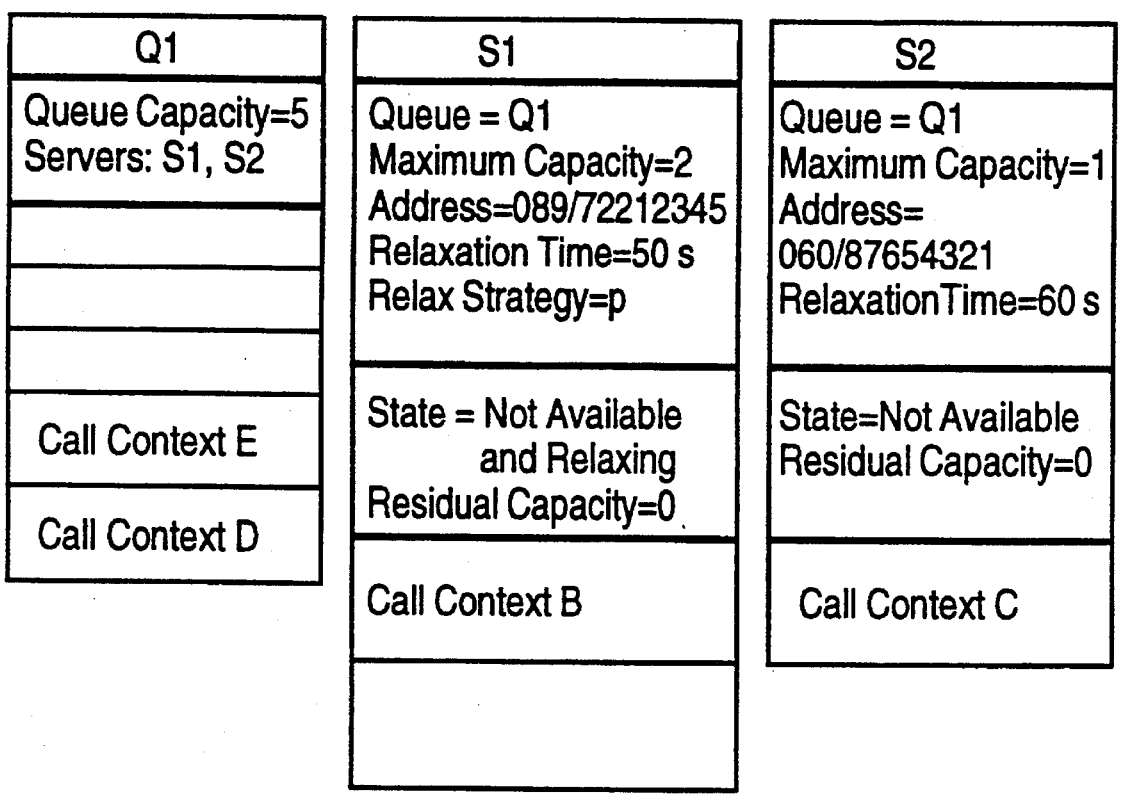
FIG. 6 is a diagram illustrating clearing by a server of an allocated call-down and setting of the reserve capacity counter and starting of a relaxation timer for the server.

A relaxation strategy that is to be used by the queue program for this server. Two examples of such relaxation strategies shall be set forth in greater detail below with reference to FIGS. 5 and 6.

From the view of the queue program, a queue is represented by at least the following, semi-permanent data:

a maximum queue capacity qC(t) that indicates the maximum plurality of calls that can be collected in a queue or that can wait therein for distribution. When this capacity has been exhausted, incoming calls are forwarded to an announcement and are subsequently cleared down. The queue capacity can be time-dependent. Calls that are already waiting in the queue, however, are no longer cleared down, even given a reduction of the queue capacity.

Beyond this, the queue program implements a strategy for call distribution that determines how incoming calls are distributed onto the allocated servers and what queue is serviced first when a server becomes free and more than one queue is allocated to this server.

The view of the queue program about the status of a server i is reflected by the following, transient data:

a capacity reserve counter RC(i) that reflects the remaining, free capacity of a server i;

a list having N(i) records wherein the contexts of those calls that are being momentarily handled by the server i, i.e. that are active at the moment at the server i, are stored. These records, which shall be referred to below as "call contexts" according to their content, are addressed via a TCAP transaction identifier and are monitored by a specific monitoring procedure (activity test procedure) between the service switching point and the service control point in the time intervals $T_{AT}$.

FIG. 1 shows an example of the data kept by the queue program in the service control point and that reflect the conditions of a queue Q1 and of the servers S1 and S2. The queue Q1 has a capacity of five, i.e. it can accept a maximum of five calls. The server S1 is in the position to accept two calls in parallel, i.e. simultaneously, whereby the server S2 has a maximum capacity of only one, i.e. is only in the position to accept respectively a single call. Given the snapshot shown in FIG. 1, the two servers have no residual capacity (no capacity reserve) because they are both occupied with IN calls A, B and C.

Figure 2:
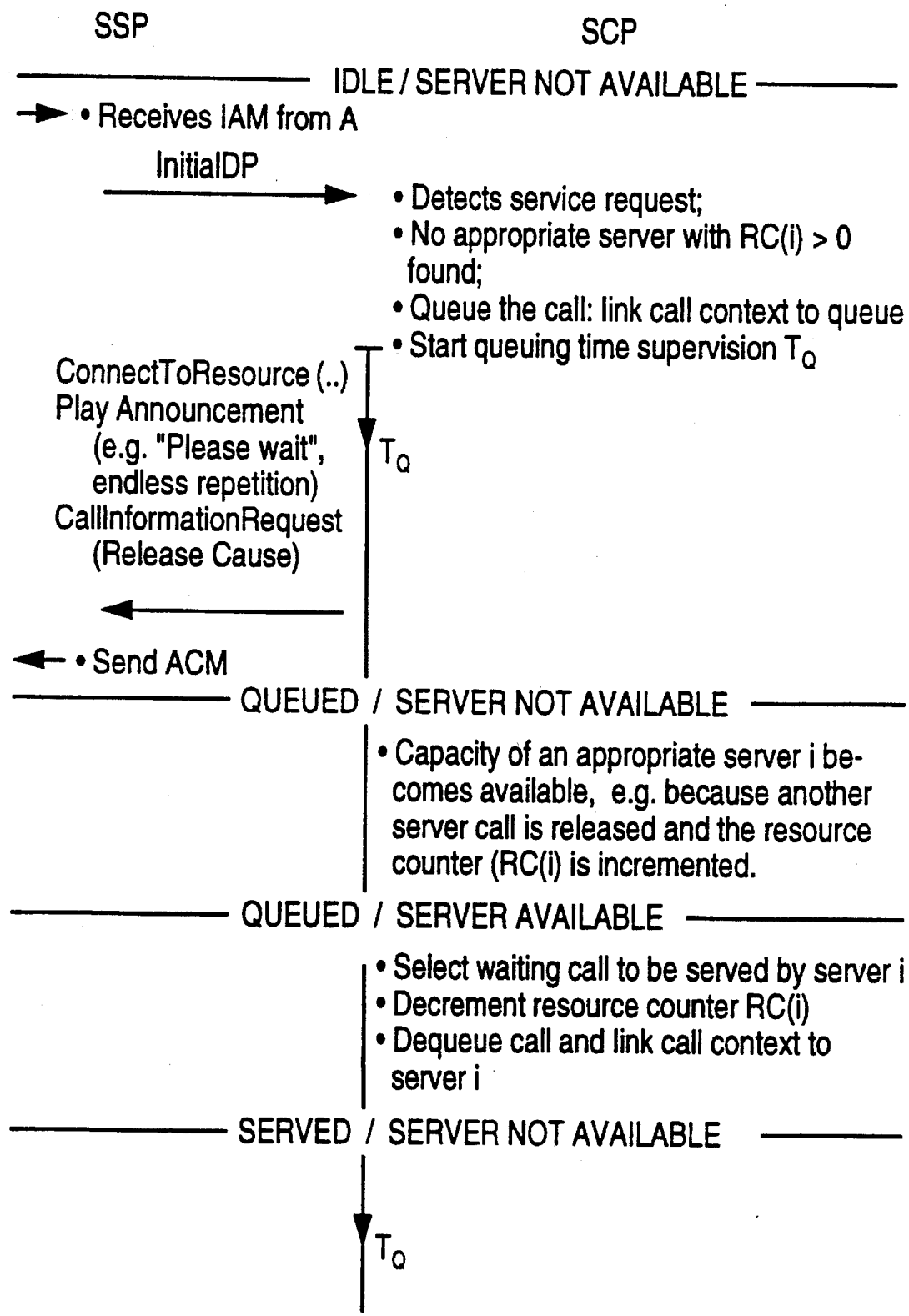
FIGS. 2-A and 2-B are flow charts showing a message flow between a service switching point SSP and a service control point SCP.
Figure 2:
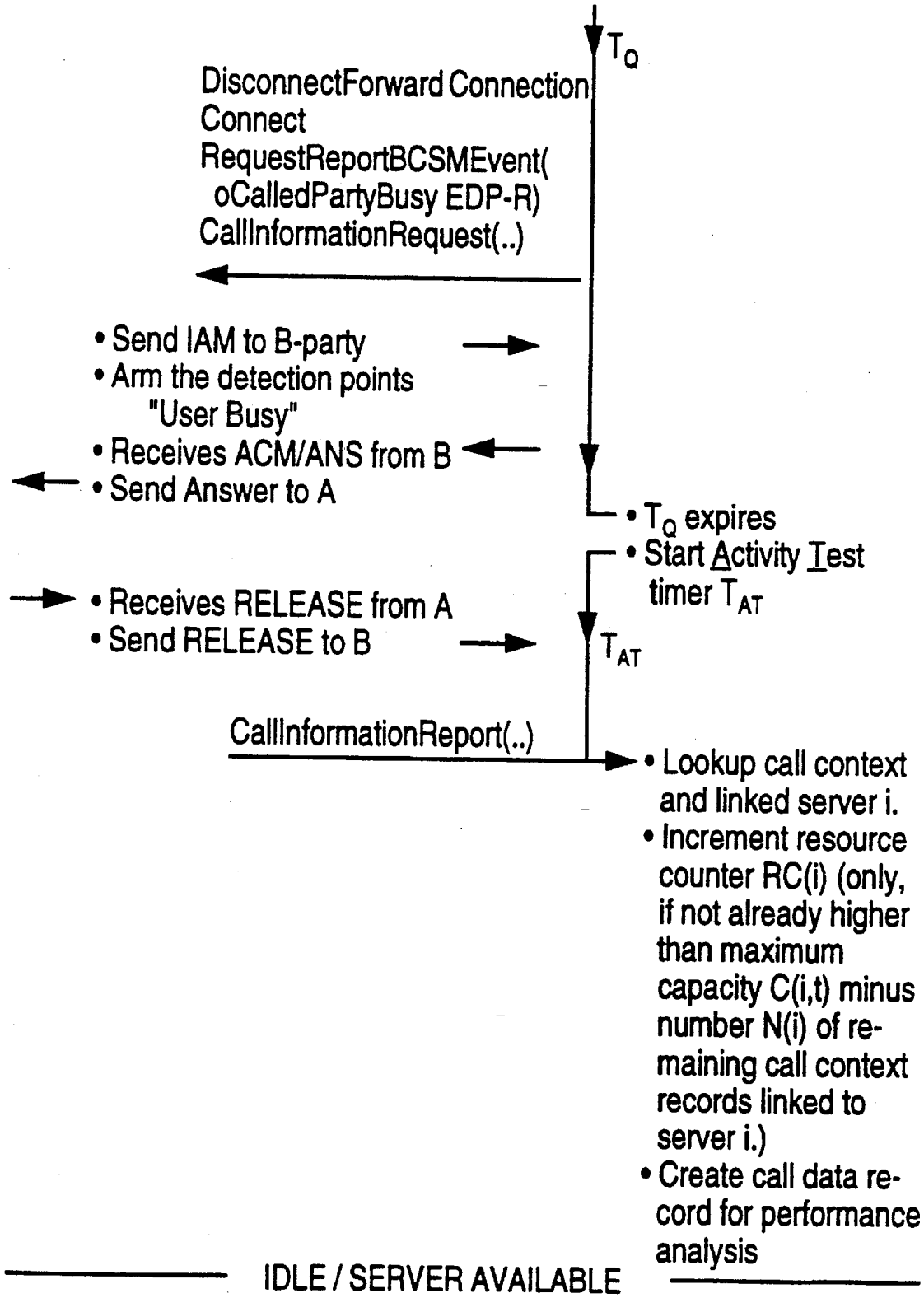

FIG. 2 shows the message flow between SSP and SCP given a successfully serviced call, whereby what is to be understood by a successfully serviced call is a call that is distributed by the SCP to a server and this server does not cleardown the call distributed to it because of lack of capacity.

First, the service switching point SSP, which represents the access of a subscriber to the intelligent network, receives the initialization message IAM, which triggers the call relative to the IN, from the originating switching point of a subscriber A. In response thereto, the access switching points sends the SCP the initialization message "initial D" on the basis whereof the SCP registers a service request and subsequently starts the queue program. At this point in time, the queue program does not find an available server, this being expressed in FIG. 2 by the status description "server not available". The expression "IDLE" in FIG. 2, furthermore, expresses that the call or the service request has not yet been handled by the queue program.

Since in the present case the queue program did not find an available server, the queue program enters the call into the queue in that it attaches the call context to the data structure "queue". At the same time, it starts a queue timer $T_Q$ that defines a maximum dwell time of the call in the queue. The value for the timer $T_Q$ is dependent on the service requested by the call.

In order to bridge the waiting time of the subscriber a for the requested service, a wait message is played to the subscriber A, requested by the instructions "connected_to resource" and "play_announcement".

After a certain waiting time, one of the existing servers, for example a server i, becomes available again, i.e. its capacity reserve counter RC(i) again becomes greater than 0 because, for example, an IN call serviced by this server i has been ended. This status change is marked in FIG. 1 by the expression "server available". In response thereto, the queue program selects a call waiting in the queue, this now being allocated to the server i, i.e. which is now to be serviced by the server i. After the allocation has been carried out, the queue program correspondingly deincrements the capacity reserve counter RC(i). It also removes the call from the queue and attaches the call context to the data structure "server i" that it maintains. The status description of the call is now changed from "queued" to "served" and the status description of the server is now changed from "server available" to "server not available".

The queue timer, moreover, also continues to run when the call allocated to the server i is rejected by the server and the call must again be entered into the queue in this case by the queue program. In this case, namely, the entire, maximum waiting time dare not be monitored again. Moreover, the call that has been reentered must be treated with priority in another distribution.

The allocation of a call to a server i occurs via the operations "connect" and "request report_BCSM_event" with which the SCP instructs the access service point SSP to conduct the call to the server i and to arm the detection point "user busy" as an event detection point of the type "request" (i.e, the call processing is suspended when the detection point is hit). Dependent on service requests, the detection point "no answer" can be additionally armed.

Via the operation "call_information_request", the SCP, over and above this, requests a message from the access switching point regarding the reason for the cleardown and a time stamp about the call that represents the reason for the cleardown. This assures that the SCP is informed when a call is cleared down and that, via the time stamp, it receives appropriate data in order to keep a corresponding statistic about the server performance.

The access switching point sets up the connection to the server i via the message IAM with the assistance of the routing number of the server i and arms the afore-mentioned detection points. After the call set up, the server i services the call and, after a certain time, this is in turn cleared down either by the server i or by the subscriber A, as, for example, in FIG. 2.

The key timer $T_Q$ is designed such that it normally runs during the servicing of the call by the server i. After the run-down of this timer, an activity test timer $T_{AT}$ is set. If this runs down, i.e. if its run-down is not prevented by the arrival of the end message "call information_report", the SCP initiates an activity test procedure that checks whether the server is in fact still busy with the servicing of the call.

When the subscriber A has cleared the calldown, the access switching point informs the SCP about the cleardown of the call via the message "call_information_report". In response thereto, the SCP looks in the call context and the data structure "server i" to which this call context is linked. Finally, the SCP correspondingly increments the capacity reserve counter RC(i), stores the call data relevant for the performance analysis, and releases the call context for the call.

Since the maximum server capacity C(i, t) can be time-dependent, it must always be assured that the reserve capacity counter does not exceed the maximally available server capacity C(i, T)-N(i), whereby N(i) indicates the number of call contexts that are linked to the server i.

Figure 3:
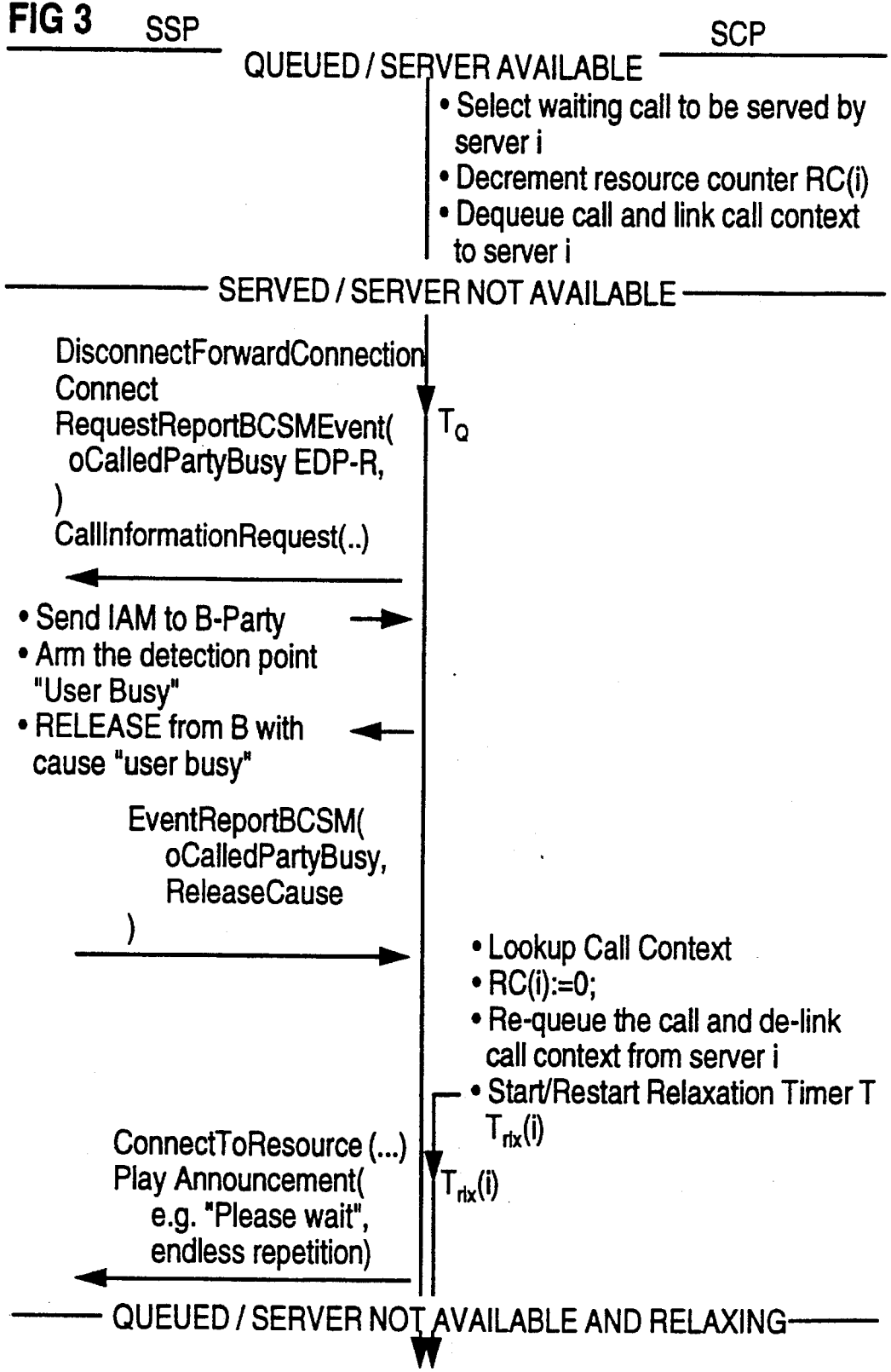
FIG. 3 is a flow chart showing how a service control point SCP adapts its model of a server status when it finds a discrepancy between an anticipated server status in an actual service status.

FIG. 3 shows how the SCP adapts its model of the server status when it finds a discrepancy between the anticipated server status ("available") and the actual server status ("not available").

First, the message flow is the same as in the case of a successfully serviced call (see FIG. 2). After the access switching point has set up the connection to a server i, however, a backward cleardown, i.e. a cleardown by the server i, with the cleardown reason "user busy", however, is registered by the access switching point SSP, differing from the case according to FIG. 2. This case, for example, can occur when the server i can also service calls that are not switched via the intelligent network, or when it, itself, can initiate calls.

The access switching point informs the SCP of this cleardown of the server i via the message "event_report_BCSM". In response thereto, the SCP first looks in the call context and then in the server i that is linked to this call context, and sets the displayed value of the reserve capacity of the server i, or sets the reserve capacity counter RC(i) to 0.

Thereupon, the SCP starts the relaxation timer $T_{rix}(i)$ of the server i, whereby this is a matter of a server related timer, and not a matter of a call related timer.

Finally, the call is again entered into the queue and the linkage of the call context to the server i is canceled. This occurs only in case the queue timer $T_Q$ has not yet run down. Via the commands "connect_to_resource" and "play_announcement", the access switching point is instructed by the SCP to connect the subscriber A to an announcement that, for example, requests the subscriber to hold.

Figure 4:
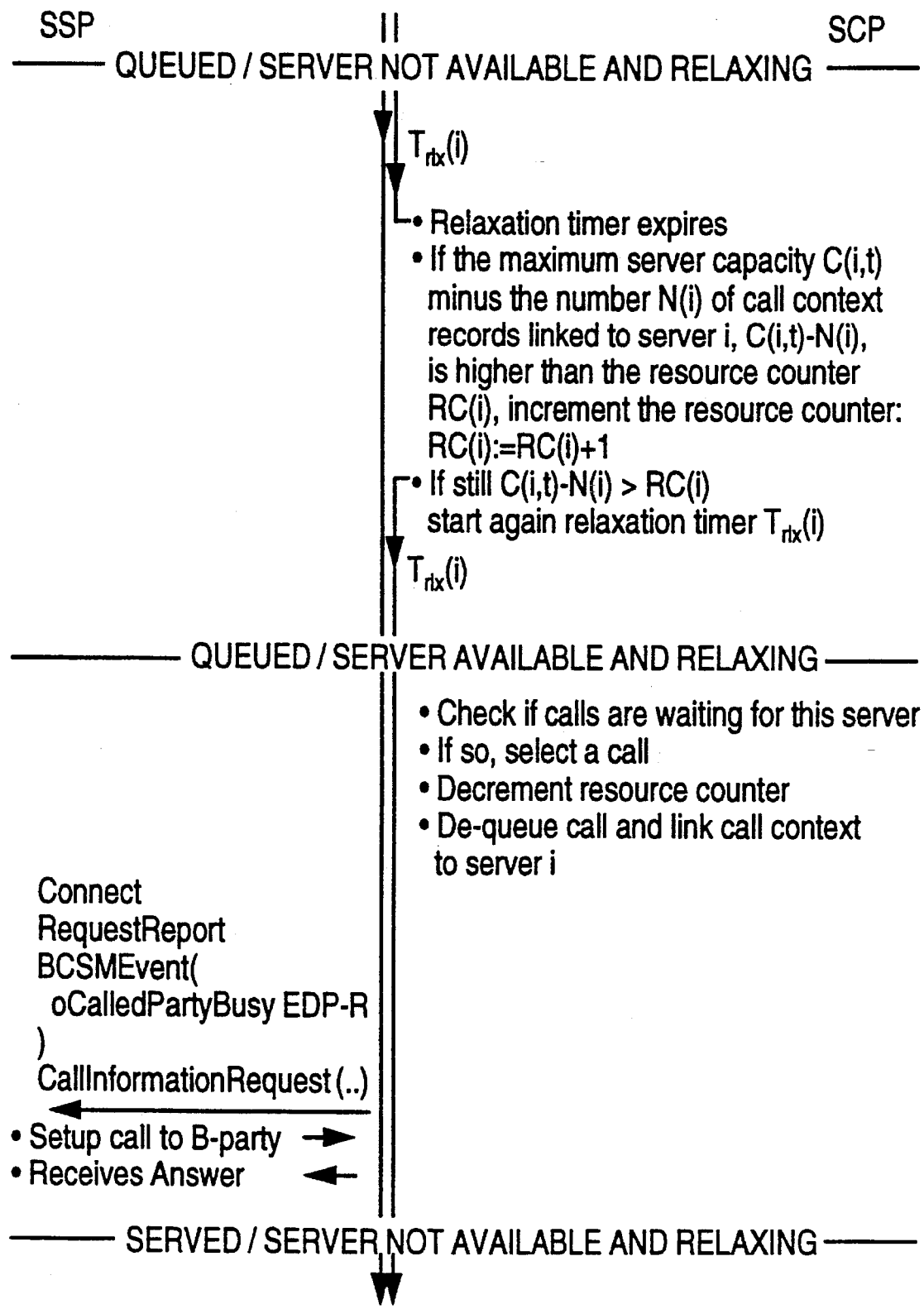
FIGS. 4A and 4B show two different relaxation strategies.
Figure 4:
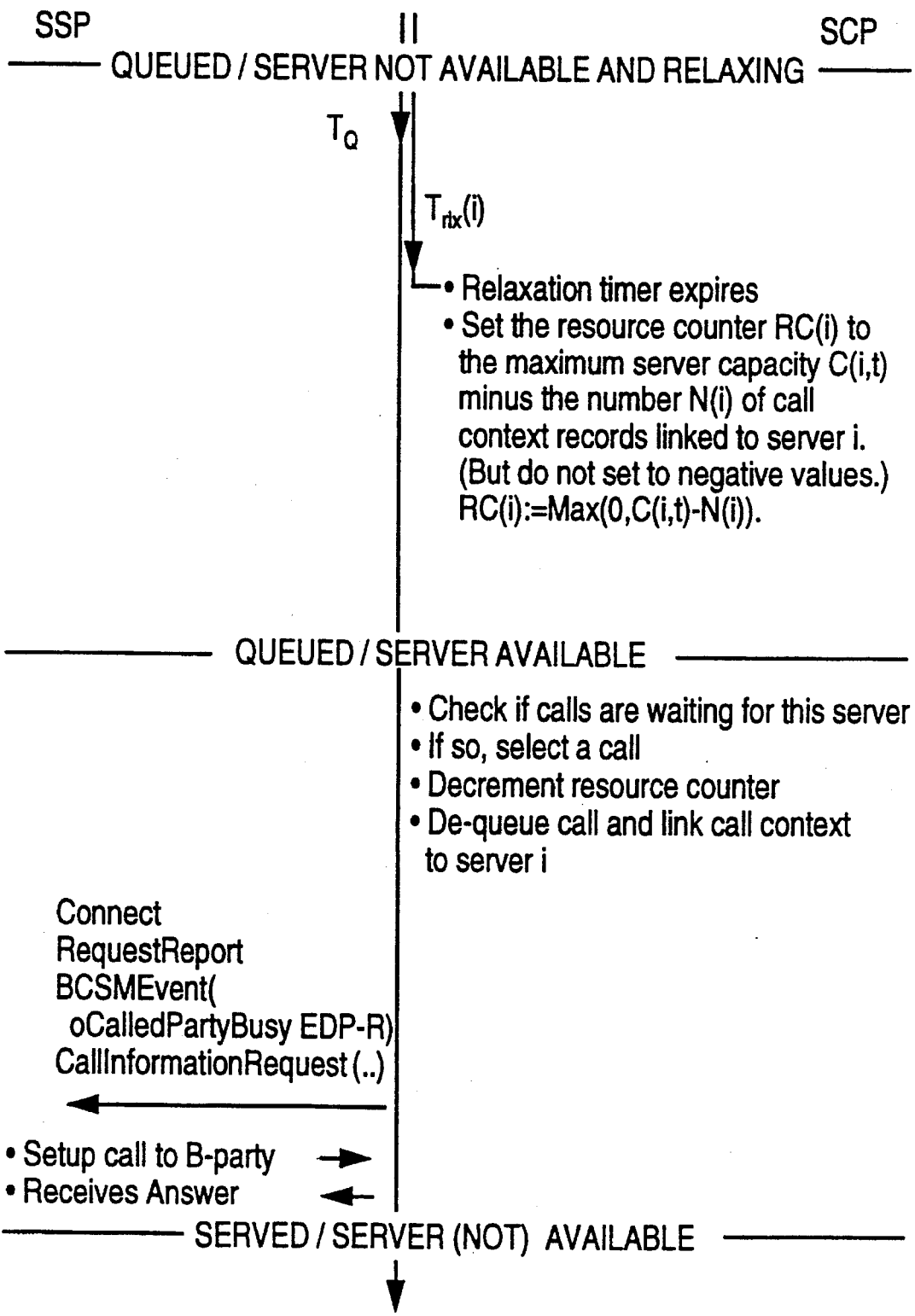

When the queue timer has run down, the call is not reentered, but is cleared down (see FIG. 4).

When the relaxation timer runs down, the capacity reserve counter of that server that triggered the relaxation timer is incremented. The amount by which the capacity counter is incremented is dependent on the relaxation strategy that is assigned to a respective server. Two different relaxation strategies are illustrated by FIGS. 4a and 4b.

FIG. 4a shows the pessimistic relaxation strategy, whereby the reserve capacity counter is respectively incremented by only one after every run-down of the relaxation timer. When, after respective incrementation by one, it is still lower than the indirectly identified reserve capacity C(i, t)-N(i), the relaxation timer is started again. With the pessimistic relaxation strategy, the reserve capacity counter is thus matched step-by-step to the indirectly identified reserve capacity of the server.

The pessimistic relaxation strategy is best suited for those cases wherein the server itself maintains an additional local queue and must sequentially service calls according to this queue. In this case, the server capacity only becomes available step-by-step.

The optimistic relaxation strategy is suitable, for example, for those cases wherein the server (for example, attendant group) can service calls in parallel and it therefore need not maintain a local queue. The time wherein the capacity of such a server is blocked by non-IN calls will thus usually not be dependent on the number of such non-IN calls.

When server capacity becomes available, a check is carried out whether calls must wait to be serviced by this server.

If this is true, the next call to be serviced is selected from a queue according to a queue strategy. The selected call is disconnected from the announcement and is connected to the server. In order to undertake precautionary measures for that case when the server is still busy, the corresponding, aforementioned detection points are armed.

FIG. 5 shows another example of the data maintained by the queue program at a specific point in time. It is thereby assumed as prior history that the server S1 has cleared down a call A and immediately accepted a call thereafter that is not handled by the intelligent network, so that the intelligent network or, to be more precise, the queue program, cannot register that the server S1 is busy again. The data-wise reflection of this situation is shown in FIG. 5.

Due to the existing data, the queue program of the service control points will allocate the call D to the server S1.

Since the actual reserve capacity of server 1 is equal to 0, the server 1 will clear the allocated calldown and the SCP will be informed thereof with the assistance of the detection point "user busy". Thereupon, the SCP will again enter the call D into the queue, will set the reserve capacity counter for counting the residual capacity to 0, and will start a relaxation timer for the server 1. This situation is shown in terms of data in FIG. 6.

After a relaxation time of 50 seconds in this case, the relaxation timer runs down and the SCP again increments the reserve capacity counter to the display value of one. This situation is indicated in FIG. 7.

It may also be seen from FIG. 7 that the call C was cleared down during the relaxation phase of the server 1, and that the call D has now been assigned to the server 2 and is being serviced by it. From the view of the SCP, the server 1 is now in position to again service a call and the call E waiting in the queue to be serviced is therefore to be allocated to it.

Figure 8:
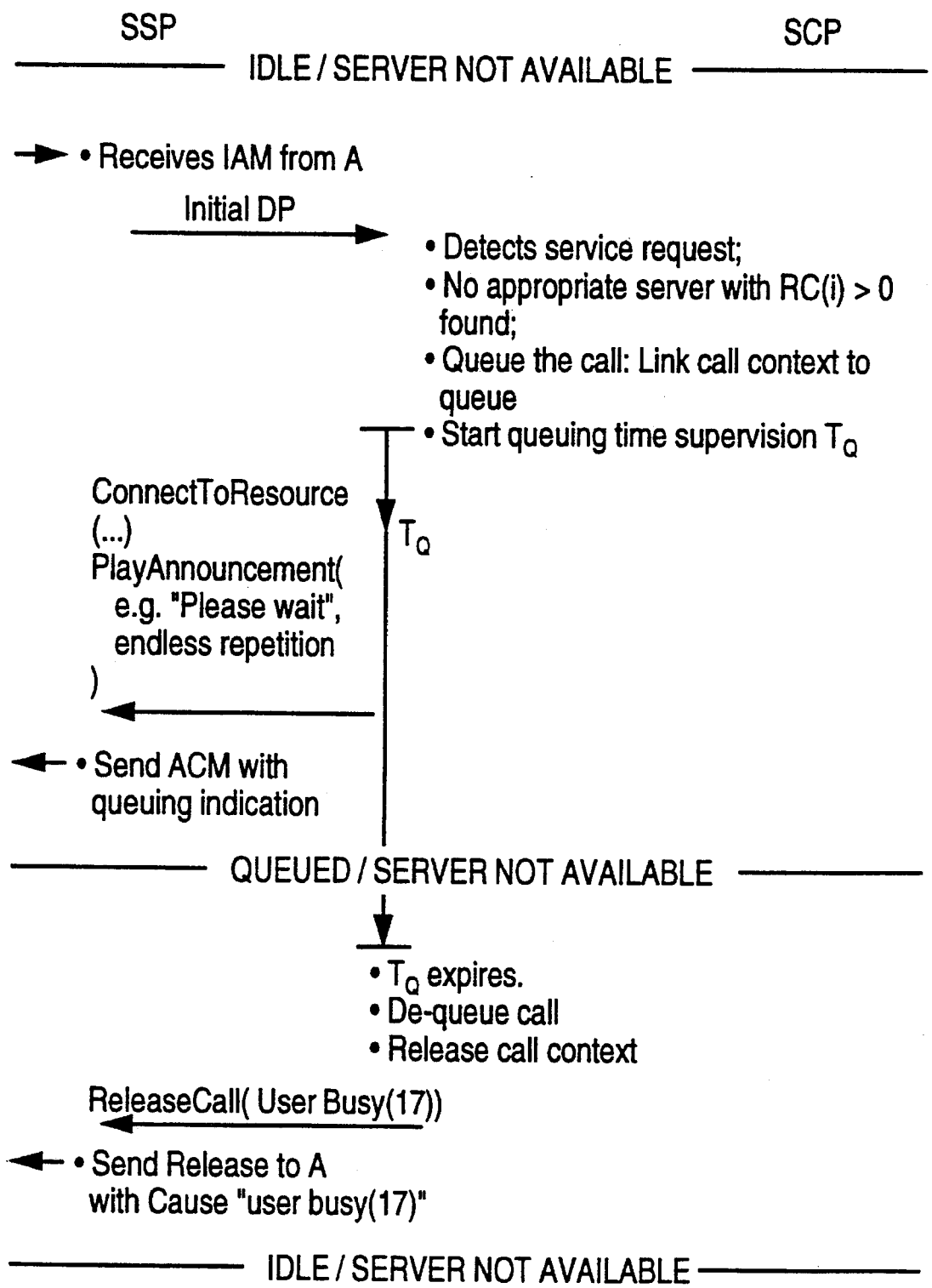
FIG. 8 shows a flow chart when the queue timer runs down and the call is still entered in the queue.

FIG. 8 shows the handling of a case wherein the queue timer runs down and the call is still entered in the queue. In this case, the call context is removed from the queue and is released. The access switching point then receives the instruction to clear the call down via the operation "release_call", namely because of the cleardown reason "user busy". Further, a call data record is generated for the purpose of performance analysis. Subsequently, the call context is released.

Finally, the access switching point clears the calldown with the ISUP command "release" that is sent to the corresponding equipment of the subscriber A.

Although various minor changes and modifications might be suggested by those skilled in the art, it will be understood that I wish to include within the scope of the patent warranted hereon all such changes and modifications as reasonably come within my contribution to the art.

I claim as my invention:

1. A method for distributing calls in a communication network, comprising the steps of:

registering calls by a central authority of the communication network and subsequently allocating the calls to servers that then service the calls;

also servicing calls with the servers that have not been registered and allocated by the central authority;

after a successful allocation, monitoring with the central authority whether a server does a cleardown of an allocated call due to lack of capacity; and in case of the cleardown of the call due to lack of capacity, excluding the server from a further allocation of a call by the central authority for a specific time span or reducing a probability for a further allocation for said time span.

2. A method according to claim 1 wherein in case of cleardown of the call due to lack of adequate capacity, the call is allocated to a different server without an ensuing cleardown being perceptible for a calling party.

3. A method according to claim 1 wherein the allocation by the central authority is implemented with assistance of display values about reserve capacities of the servers, a display value of reserve capacity of a server is formed or updated in that a previous display value is deincremented at every successful allocation of a call to the server by a capacity of the call and is correspondingly incremented given every occurring cleardown, and the allocation to a server is only allowed to occur when the display value belonging to the server indicates an adequate reserve capacity.

4. A method according to claim 3 wherein in case of the cleardown of the call by the server due to lack of adequate capacity, the probability for a further allocation of a call to this server is diminished since the display value of the reserve capacity of the server is reduced by a correction value for a specific time span, and wherein the correction value corresponds to the display value at the point in time of the unsuccessful allocation or of the cleardown.

5. A method according to claim 4 wherein a charging of the display value of the reserve capacity with a correction value is completely retracted after expiration of said time span.

6. A method according to claim 4 wherein a charging of the display value of the reserve capacity with a correction value is retracted step-by-step, a step length corresponding to said time span.

7. A method according to claim 1 wherein calls that cannot be immediately distributed due to lack of adequate capacity of the servers are first intermediately stored in a queue, a hold request being communicated to the calling party as warranted.

8. A method for distributing calls in a communication network, comprising the steps of:

registering calls by a central authority of the communication network and subsequently allocating the calls to servers that then service the calls;

also servicing calls with the servers that have not been registered and allocated by the central authority;

after a successful allocation, monitoring with the central authority whether a server does a cleardown of an allocated call due to lack of capacity; and in case of the cleardown of the call due to lack of capacity, performing one of the functions of excluding the server from a further allocation of a call by the central authority for a specific time span, and reducing a probability for a further allocation for said time span.

* * * * *